(12) United States Patent
Wilson et al.

(10) Patent No.: US 6,549,693 B2
(45) Date of Patent: Apr. 15, 2003

(54) FIBER OPTIC SWITCH PACKAGE AND METHOD OF ASSEMBLING A FIBER OPTIC SWITCH PACKAGE FOR REDIRECTING FIBER PATH

(75) Inventors: Howard P. Wilson, Hudson, WI (US); Souksamay Chounlamontry, Maplewood, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/808,637

(22) Filed: Mar. 14, 2001

(65) Prior Publication Data

US 2002/0131680 A1 Sep. 19, 2002

(51) Int. Cl.[7] .............................. G02B 6/26; G02B 6/42
(52) U.S. Cl. ....................................................... 385/18
(58) Field of Search .............................. 385/17, 18, 51, 385/50, 14, 49, 92

(56) References Cited

U.S. PATENT DOCUMENTS 4,601,541 A * 7/1986 Shaw et al. .................. 385/51
4,976,510 A   12/1990 Davila et al. ............... 350/96.2
5,189,724 A    2/1993 Hartley ........................ 385/135
5,822,482 A * 10/1998 Atkeisson et al. ............ 385/51

FOREIGN PATENT DOCUMENTS

EP   0 389 206 A2    9/1990
WO   WO 00/52509    9/2000

OTHER PUBLICATIONS

Lee, S. et al., "Free–Space Fiber–Optic Switches Based on MEMS Vertical Torsion Mirrors," *Journal of Lightwave Technology*, vol. 17, No. 1, pp. 7–12 (Jan. 1999).

* cited by examiner

*Primary Examiner*—Javaid Nasri
(74) *Attorney, Agent, or Firm*—Merchant & Gould P.C.

(57) ABSTRACT

A fiber optic switch package and method of assembling the same with improved protection of the fibers and simple assembly. The package redirects or bends optical fibers of a 2×2 or 1×2 MEMS optical switch in the package so that instead of exiting the package from four ends, the fibers exit the package from two ends. By exiting the package from two ends, real estate on a printed circuit board is conserved and packages can be located closer to other packages on a printed circuit board.

19 Claims, 5 Drawing Sheets

FIBER OPTIC SWITCH PACKAGE AND METHOD OF ASSEMBLING A FIBER OPTIC SWITCH PACKAGE FOR REDIRECTING FIBER PATH

FIELD OF THE INVENTION

The present invention is directed to a fiber optic switch package and a method of assembling said package, and, more particularly, a microelectromechanical (MEMS) based fiber optic switch package for an optical component.

BACKGROUND OF THE INVENTION

Elaborate structures and manual assembly techniques are presently required to contain and protect optic fibers exiting from packages containing semiconductor devices. It is particularly important that the optic fibers of such components be protected from damage. Several approaches have been used. One example is the use of fiber pipes as seen on costly 14 pin butterfly packages that house pump laser devices and other similar devices. Another example is the use of epoxy to encapsulate a subassembly of a MEMS chip to optic fibers which is then covered with a conventional TO-8 can style cover. A further assembly is then required to reinforce and contain the fibers and support strain relief components, adding cost and complexity.

Also, because most optical switch chip fiber layouts are cross-shaped, the fibers exit from each corner of the switch, i.e., four ends. Because the fibers exiting the switch are fragile, they can not be tightly or sharply bent outside the switch. In addition, because the fibers exit from four ends, valuable real estate is consumed when the switch is mounted to a circuit board. Also, such a configuration limits the proximity within which switches may be placed next to one another.

It is thus desirable to provide a package for housing fiber optics interfacing with semiconductor devices and protecting the fibers that exit from the housing. It is also desirable to allow the fibers to exit the switch at two ends instead of at four ends to reduce the amount of real estate that needs to be allocated on a printed circuit board. It is also desirable to provide a package that gently bends fibers within the switch so that the risk of damage to the fibers is reduced. Furthermore, it is desirable to provide a package that provides strength and isolation from mechanical stresses outside the package on the semiconductor device housed in the package and the fibers exiting the package.

SUMMARY OF THE INVENTION

According to a first aspect of the invention, there is provided an optical component package. The package has a housing having a first side and a second side and means for bending optical fibers in the housing so that the fibers exit the housing from the first and second sides.

According to a second aspect of the invention, there is provided an optical component package. The package includes a bottom plate, a top plate, and a left and right side piece. The bottom plate has a top surface with symmetrically positioned islands located on the top surface, the islands having rounded corners. The top plate has a bottom surface that faces the top surface of the bottom plate, and has symmetrically positioned islands located on the bottom surface, the islands having rounded corners. Each side piece has rounded cutouts that are complimentary to the rounded corners of the islands wherein the left and right side pieces fit in a left and right cavity, respectively, formed when the top plate is disposed on the bottom plate, wherein the rounded cutouts of the left and right side pieces mate with the rounded corners of the islands to form a channel there between.

According to a third aspect of the invention, there is provided a method of assembling an optical component package. The method includes steps of:

(a) disposing a MEMS optical switch on a top surface of a bottom plate, the bottom plate having symmetrically positioned islands with rounded corners located on the top surface, the MEMS optical switch having four fibers extending from four different ends of the MEMS optical switch;

(b) bonding the MEMS optical switch to the top surface;

(c) attaching optical fibers to the MEMS optical switch;

(d) disposing a top plate on the bottom plate, the top plate having a bottom surface that faces the bottom plate wherein the bottom surface is identically configured as the top surface;

(e) inserting a left side piece between the top and bottom plates, the left side piece having round cutouts that are complimentary to the rounded corners of the islands so that when the left side piece is inserted, it causes the fiber to bend;

(f) inserting a right side piece between the top and bottom plates, the right side piece having round cutouts that are complimentary to the rounded corners of the islands so that when the right side piece is inserted, causes the fibers to bend.

DETAILED DESCRIPTION OF THE PRESENTLY PREFERRED EMBODIMENTS

Figure 1:
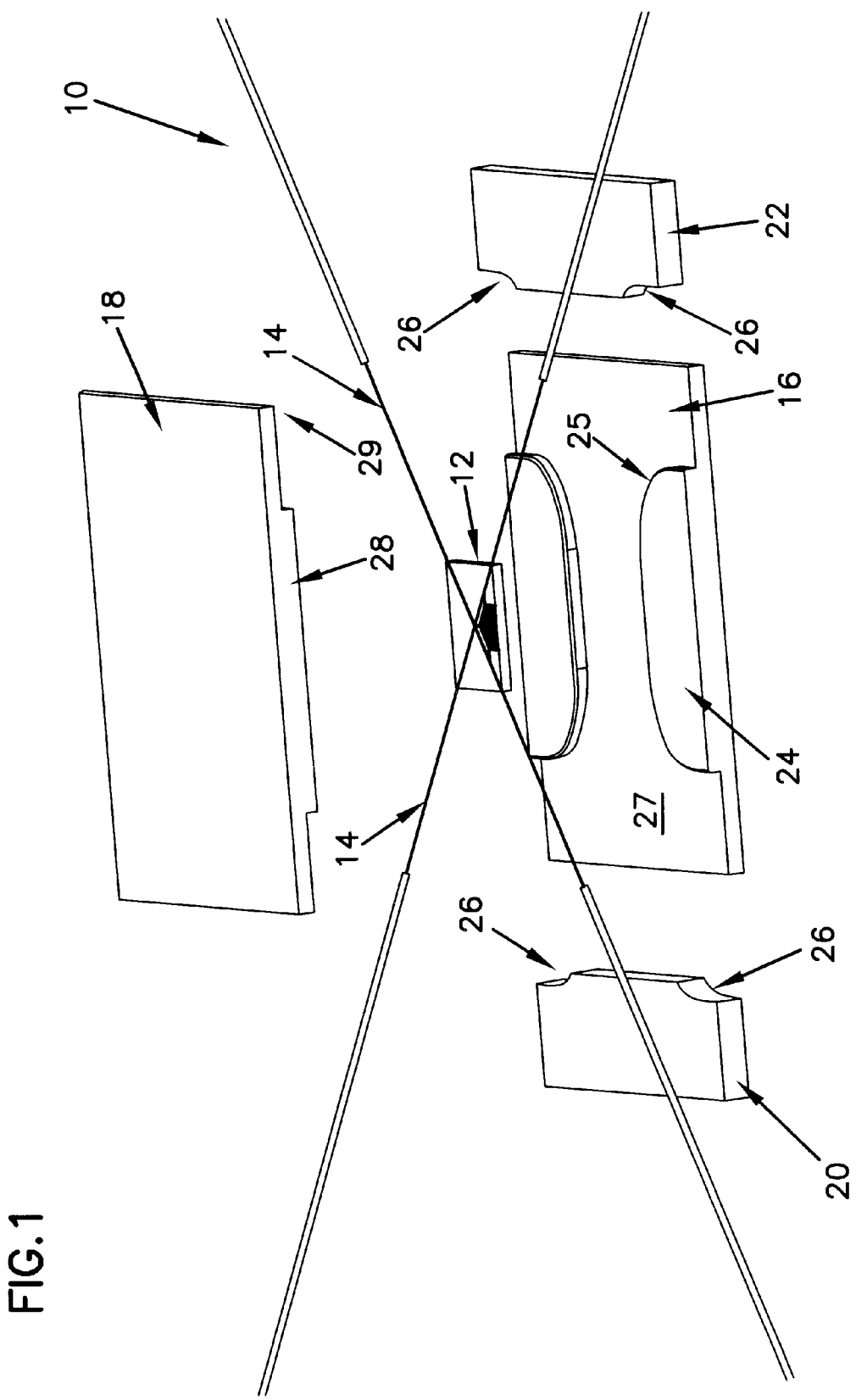
FIG. 1 is an exploded perspective view of a MEMS optical switch package according to a preferred embodiment of the present invention.

FIG. 1 is an exploded perspective view of a package according to a preferred embodiment of the present invention. The package is meant to house an optical switch, and more particularly, a 2×2 optical switch. In addition, the optical switch could be a 1×2 switch by omitting on of the illustrated fibers. The package 10 includes a MEMS optical switch 12 having optical fibers 14 located thereon and extending therefrom, a bottom plate 16, a top plate, a left side piece 20 and a right side piece 22. In a preferred embodiment, the bottom and top plates 16, 18 and left and right side pieces 20, 22 are made of plastic, ceramic or metal. When assembled as will be described hereinafter, the assembled package has a dimension of about 1 inch by about 1 inch by about half an inch thick. Of course the package may be made out of other materials and have other dimensions depending on the environment in which it is used.

The bottom plate 16 is generally square in shape although it may be rectangular, for example. Two symmetrically positioned islands 24 are formed on the bottom plate 16. The islands 24 are raised above a top surface 27 of the bottom plate 16. The islands 24 have rounded corners 25. The bottom surface 29 of the top plate 18 that faces the top surface 27 of the bottom plate 16 has an identical configuration to that of the bottom plate 16. The left and right side pieces 20, 22 each have cutout corners 26 that are substantially complementary to the rounded corners 25 of the islands 24. The top and bottom surfaces of the left and right side pieces are flat.

Figure 2:
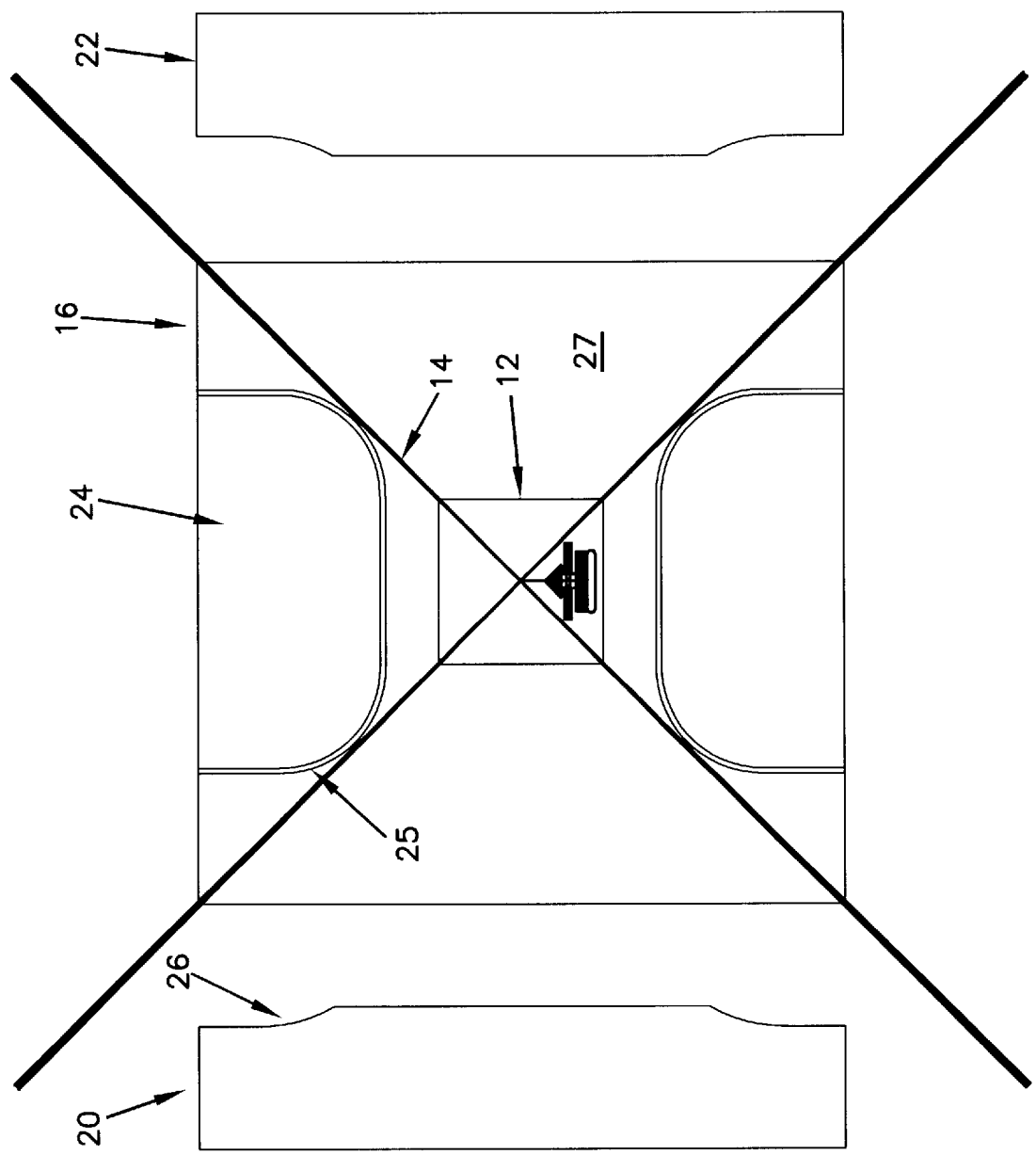
FIG. 2 is a plan view of a portion of the package shown in FIG. 1.

FIG. 2 is a plan view of a portion of the package 10 shown in FIG. 1. The MEMS chip 12 is mounted in a center region of the top surface 27 of the bottom plate 16. The fibers 14 are positioned on the chip as is well known. Each fiber 14 extends from the chip 12 to a corner of the bottom plate 16 and then off the bottom plate 16. As can be seen, the fibers 14 lie adjacent to the rounded corners 25 of the islands 24. As presently configured, the fibers extend from four ends of the unassembled package. It is desirable, however, that the fibers 14 only extend from two ends of the package 10 when assembled, in order to save on real estate on a printed circuit board and allow multiple packages to be positioned next to each other. In order to do this, the fibers 14 need to be redirected or bent. The present invention allows the fibers to be redirected in an effective manner, as will be described with respect to the assembly of the package.

Figure 3:
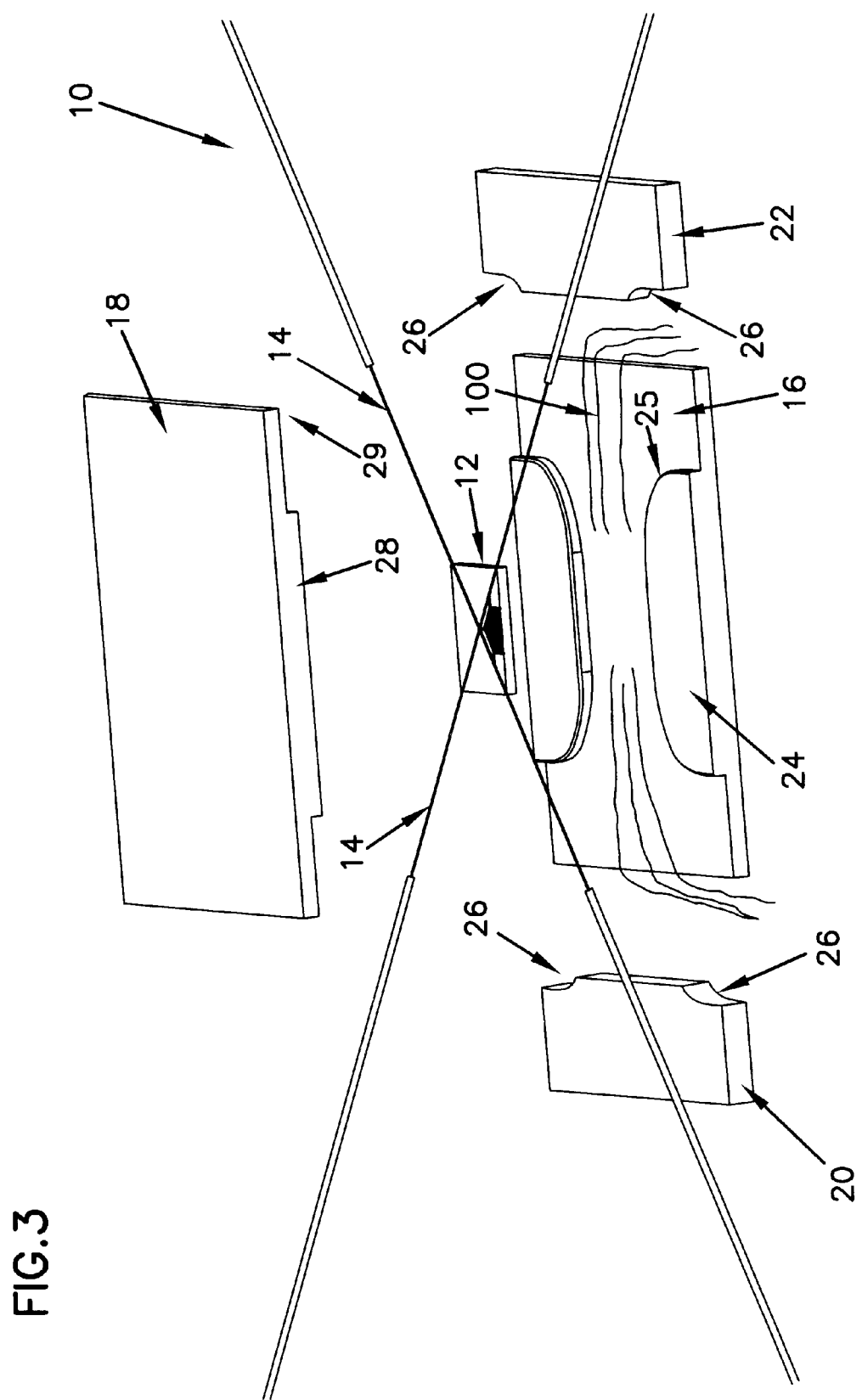
FIG. 3 is an exploded perspective view of the package according to a preferred embodiment of the present invention including a lead frame.

As is well known, optical switches require drivers to supply the switch with needed power. Generally, the drivers are electrically coupled to a circuit board and receive power therefrom. The driver then increases the received power to the level required by the switch which is typically greater than that needed by the board. The optical switch thus needs to be electrically coupled to a driver. One possible way to provide this electrical coupling is by providing a lead frame 100 on a top surface of the bottom plate 16 as seen in FIG. 3. The leads 100 of the lead frame extend over the sides of the bottom plate 16 where the lead frame can be coupled to a driver's circuitry (not shown). Another possible way of providing the needed electrical coupling is to have through holes formed in the bottom plate 16 and provide leads in the through holes.

Figure 4:
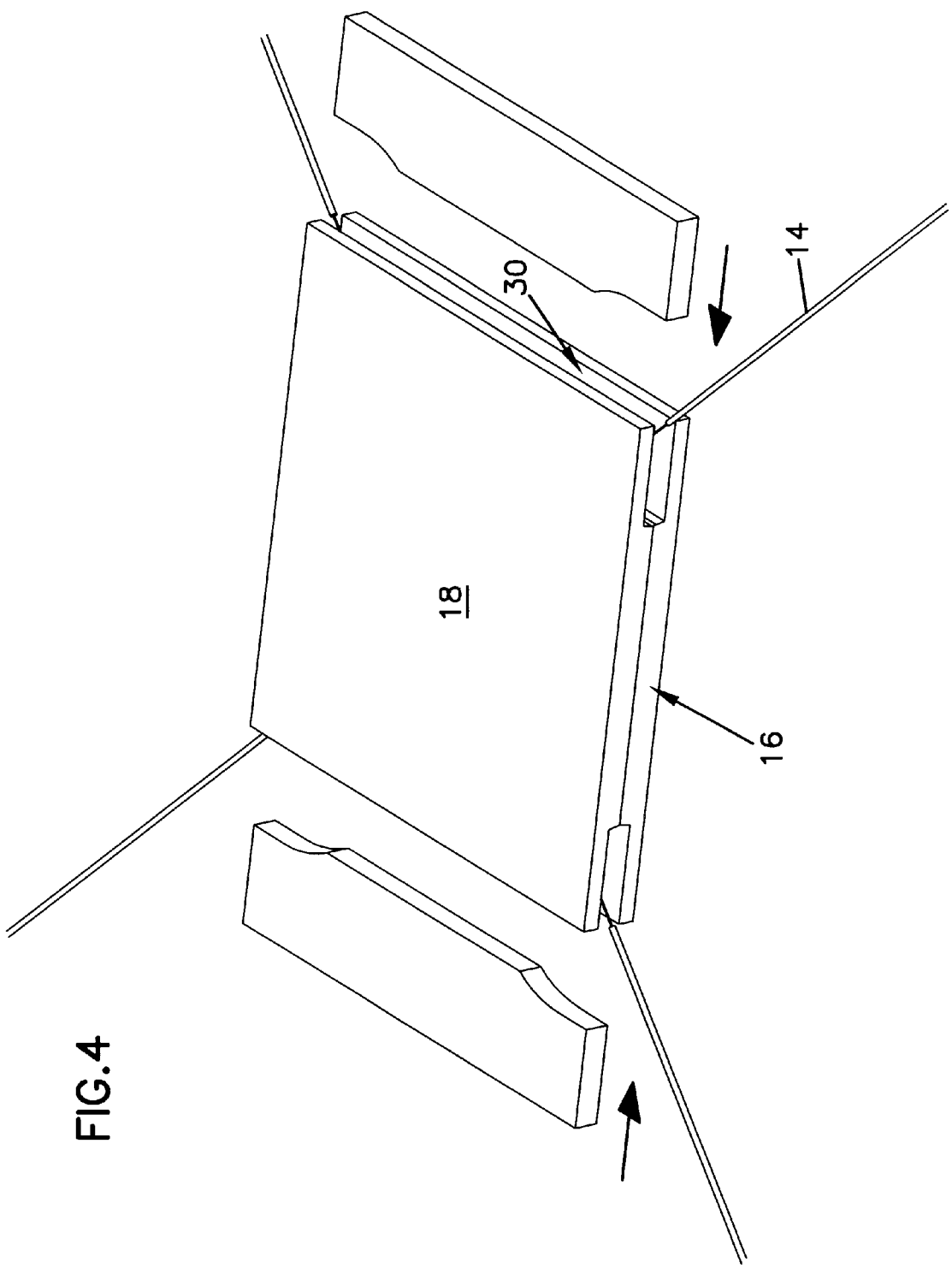
FIG. 4 is a perspective view of the package according to a preferred embodiment of the present invention partially assembled.
Figure 5:
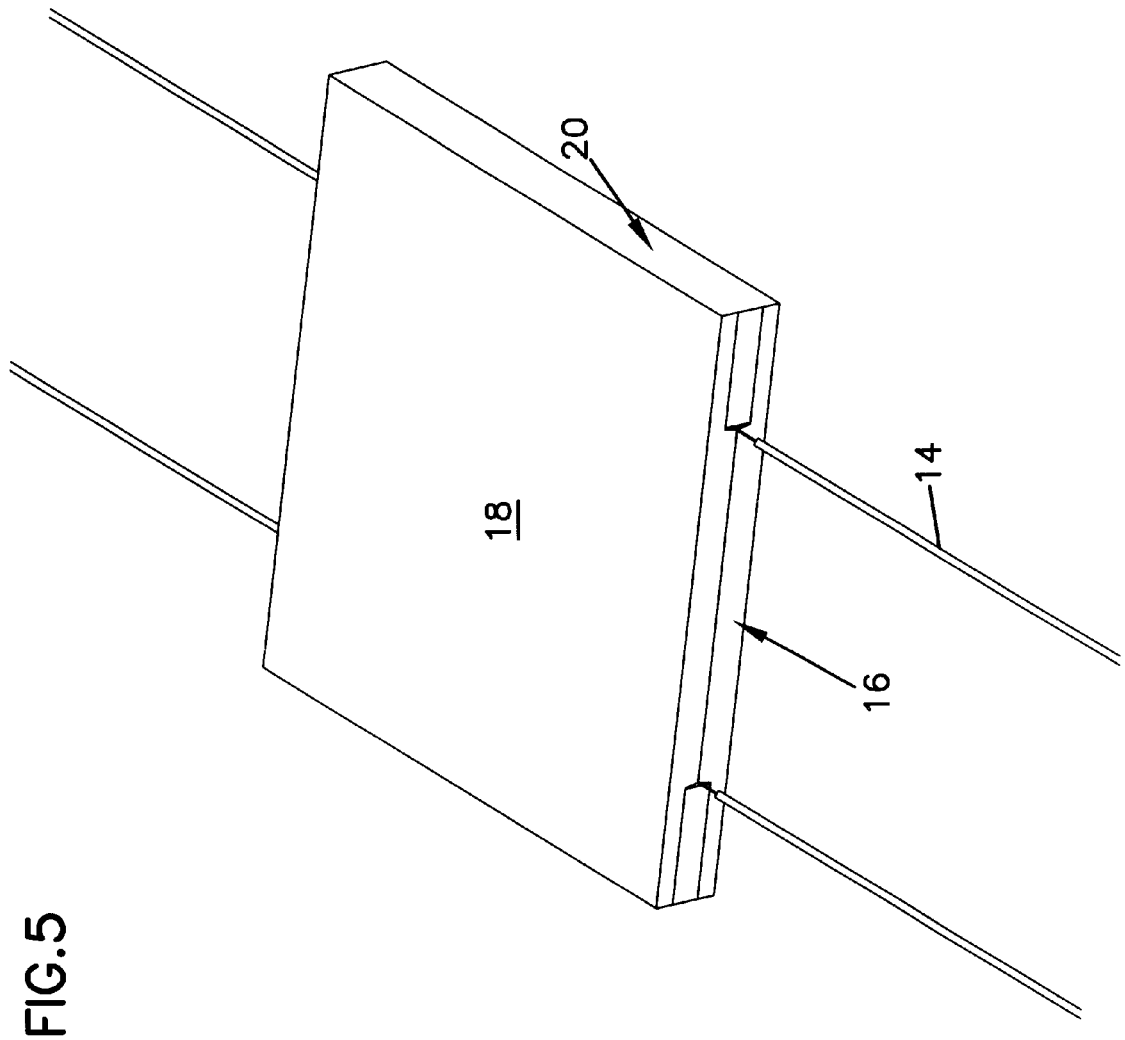
FIG. 5 is a perspective view of the fiber support device fully assembled according to a preferred embodiment of the present invention.

The assembly of the package 10 will now be described. With reference to FIG. 2, the MEMS chip 12 is positioned in the center of the bottom plate 16. The chip 12 is adhesively bonded to the top surface 27 of the bottom plate 16 and wire bonded to the lead frame 100. The fibers 14 are positioned on the chip 12 and bottom plate. The top plate 18 is placed on the bottom plate 16 as shown in FIG. 4 and bonded to the bottom plate 16. The bond may be formed by an epoxy, glue, etc. Alternatively, it may be a thermal or sonic weld. Next, an epoxy is placed on the cutout corners 26 of the left and right side pieces 20, 22 as well as their top and bottom surfaces and the side pieces are pushed into the cavity 30 formed between the top and bottom plates 18, 16. As the left and right side pieces 20, 22 are pushed into place, they contact a portion of the fibers and cause them to bend. The left and right side pieces may be pushed in simultaneously or consecutively. When the left and right side pieces 20, 22 are fully inserted, a channel is formed between the round corners of islands 24 and the cutouts 26 formed in the left and right side pieces 20, 22 and the fiber lies in the channel. This results in a package where the fibers extend from two ends of the package as opposed to four. The epoxy used on the side pieces create a sealed or closed environment. The completed assembly is shown in FIG. 5. In a preferred embodiment, boots (not shown) may be positioned over the fiber exposed outside the package.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An optical component package comprising:
 a housing having a first side and a second side, the housing including a bottom plate, having a top surface with symmetrically positioned islands located on the top surface, the islands having rounded corners and a top plate, having a bottom surface that faces the top surface of the bottom plate, the top plate having symmetrically positioned islands located on the bottom surface, the islands having rounded corners; and
 means for bending optical fibers in the housing so that the fibers exit the housing from the first and second sides, the means for bending comprising a left and a right side piece, each side piece having rounded cutouts that are complimentary to the rounded corners of the islands wherein the left and right side pieces fit in a left and right cavity, respectively, formed when the top plate is disposed on the bottom plate, wherein the rounded cutouts of the left and right side pieces mate with the rounded corners of the islands to form a channel there between.

2. A package of claim 1 wherein the fibers are bent about 45°.

3. A package of claim 1 wherein the top and bottom plates and left and right side pieces are made of plastic, ceramic or metal.

4. A package of claim 1 further comprising a lead frame disposed on the top surface of the bottom plate.

5. A package of claim 1 further comprising:
 a MEMS optical switch disposed on a center region of the top surface of the bottom plate; and
 a plurality of fibers positioned on the switch and extending from the switch and into the channel formed by the rounded corner of one of the islands and the rounded cutout of the side piece wherein the fiber is redirected in this channel.

6. A package of claim 5 wherein the MEMS optical switch is a 2×2 switch.

7. A package of claim 5 wherein the MEMS optical switch is a 1×2 switch.

8. A package of claim 7 wherein the top and bottom plates are square in shape.

9. A package of claim 1 wherein the housing is square in shape.

10. An optical component package comprising:
 a bottom plate, the bottom plate having a top surface with symmetrically positioned islands located on the top surface, the islands having rounded corners;
 a top plate, the top plate having a bottom surface that faces the top surface of the bottom plate, the top plate having symmetrically positioned islands located on the bottom surface, the islands having rounded corners; and
 a left and a right side piece, each side piece having rounded cutouts that are complimentary to the rounded corners of the islands wherein the left and right side pieces fit in a left and right cavity, respectively, formed when the top plate is disposed on the bottom plate, wherein the rounded cutouts of the left and right side pieces mate with the rounded corners of the islands to form a channel there between.

11. A package of claim 10 wherein the top and bottom plates and left and right side pieces are made of plastic, ceramic or metal.

12. A package of claim 10 further comprising a lead frame disposed on the top surface of the bottom plate.

13. A package of claim 10 further comprising:
   a MEMS optical switch disposed on a center region of the top surface of the bottom plate; and
   a plurality of fibers positioned on the switch and extending from the switch and into the channel formed by the rounded corner of one of the islands and the rounded cutout of the side piece wherein the fiber is redirected in this channel.

14. A package of claim 13 wherein the MEMS optical switch is a 2×2 switch.

15. A package of claim 13 wherein the MEMS optical switch is a 2×2 switch.

16. A method of assembling an optical component package, the method comprising steps of:
   (a) disposing a MEMS optical switch on a top surface of a bottom plate, the bottom plate having symmetrically positioned islands with rounded corners located on the top surface, the MEMS optical switch having four fibers extending from four different ends of the MEMS optical switch;
   (b) bonding the MEMS optical switch to the top surface;
   (c) attaching optical fibers to the MEMS optical switch;
   (d) disposing a top plate on the bottom plate, the top plate having a bottom surface that faces the bottom plate wherein the bottom surface is identically configured as the top surface;
   (e) inserting a left side piece between the top and bottom plates, the left side piece having round cutouts that are complimentary to the rounded corners of the islands so that when the left side piece is inserted, it causes the fibers to bend;
   (f) inserting a right side piece between the top and bottom plates, the right side piece having round cutouts that are complimentary to the rounded corners of the islands so that when the right side piece is inserted, causes the fibers to bend.

17. The method of claim 16, wherein the step of inserting a left side piece between the top and bottom plates, the left side piece having round cutouts that are complimentary to the rounded corners of the islands so that when the left side piece is inserted, it causes the fibers to bend, and the step of inserting a right side piece between the top and bottom plates, the right side piece having round cutouts that are complimentary to the rounded corners of the islands so that when the right side piece is inserted, causes the fibers to bend, are performed simultaneously.

18. The method of claim 16, wherein the step of inserting a left side piece between the top and bottom plates, the left side piece having round cutouts that are complimentary to the rounded corners of the islands so that when the left side piece is inserted, it causes the fibers to bend, and the step of inserting a right side piece between the top and bottom plates, the right side piece having round cutouts that are complimentary to the rounded corners of the islands so that when the right side piece is inserted, causes the fibers to bend, are performed consecutively.

19. The method of claim 16 further comprising a step (g) of wire bonding the MEMS optical switch to a lead frame disposed on the top surface of the bottom plate.

* * * * *

UNITED STATES PATENT AND TRADEMARK OFFICE
CERTIFICATE OF CORRECTION

PATENT NO. : 6,549,693 B2
DATED : April 15, 2003
INVENTOR(S) : Wilson et al.

It is certified that error appears in the above-identified patent and that said Letters Patent is hereby corrected as shown below:

Column 5,
Line 19, "2X2 switch." should read -- 1X2 switch. --

Column 6,
Lines 14 and 24, "the step of" should read -- wherein --

Signed and Sealed this

Twenty-third Day of September, 2003

JAMES E. ROGAN
*Director of the United States Patent and Trademark Office*